(12) United States Patent
Miyazaki et al.

(10) Patent No.: US 6,759,075 B2
(45) Date of Patent: Jul. 6, 2004

(54) BROWN BROTH

(75) Inventors: Emi Miyazaki, Kawasaki (JP); Eri Hoshikawa, Kawasaki (JP); Makoto Tanabe, Kawasaki (JP); Chiaki Nosaka, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 179 days.

(21) Appl. No.: 10/133,401

(22) Filed: Apr. 29, 2002

(65) Prior Publication Data

US 2002/0197377 A1 Dec. 26, 2002

(30) Foreign Application Priority Data

Apr. 27, 2001 (JP) ....................... 2001-131520

(51) Int. Cl.[7] .................................................. A23L 1/39
(52) U.S. Cl. ........................... 426/589; 426/52; 426/56
(58) Field of Search ............................ 426/589, 52, 56

(56) References Cited

U.S. PATENT DOCUMENTS 5,221,550 A * 6/1993 Freeman .................... 426/589
5,560,954 A * 10/1996 Elbaz ......................... 426/589
6,099,888 A * 8/2000 Tamagni et al. ............. 426/589
6,596,336 B1 * 7/2003 Gimelli et al. .............. 426/589

FOREIGN PATENT DOCUMENTS

| JP | 50-82261 | 7/1975 |
| JP | 58-165763 | 9/1983 |
| JP | 3-11752 | 2/1991 |

* cited by examiner

Primary Examiner—N. Bhat
(74) Attorney, Agent, or Firm—Oblon, Spivak, McClelland, Maier & Neustadt, P.C.

(57) ABSTRACT

A fond de veau is produced by boiling baked meats for extraction independently, separating a boiled extract therefrom, and reacting a protease with at least a residue of the meats to produce a protein decomposition solution, and then using said protein decomposition solution and said boiled extract separated from the baked meats boiled; or a protein hydrolytic solution obtained by reacting a protease on baked meats without boiling, with a boiled extract of fried vegetables. There is provided a process for easily producing a fond de veau in an industrial manner that has a quality equivalent to a fond de veau produced by a professional culinarian in a high yield.

18 Claims, No Drawings

BROWN BROTH

BACKGROUND OF THE INVENTION

1. Field of the Invention

The present invention relates to a brown broth such as a fond de veau characterized by having a pleasant flavor comparable to professional products which can be produced in high yield.

2. Description of the Background

A fond de veau is used as a broth for a brown sauce, such as, for example, represented by a demiglace sauce. Many kinds of brown sauces are produced through complex cooking operations.

Conventionally, a fond de veau is a broth for a brown sauce produced in such a manner that remnant meats (such as fibrous meats) produced upon using for cooking in a kitchen of a restaurant, beef bone and vegetable debris are sufficiently browned in an oven or fried on a frying pan and placed in a large stock pot, which is then heated all day long to boil the mixture thoroughly for a long period of time. While the recipe thereof is described in general recipe books, it requires prolonged cooking time and materials that are generally difficult to be acquired. Further, there is no detailed description for the baking temperature and the like in the recipe books, but they largely depend on experiences and instinct. Therefore, it is the current situation that fond de veau is rarely cooked at home but typically prepared by professional culinarians in restaurants.

With respect to the enzyme treatment of meats, a production process of a beef extract by reacting a protease (proteolytic enzyme) on raw beef (see JP-A-50-82261) and a liquefaction process of meats by reacting a protease on proteins of raw meats (see JP-B-3-11752) are known, but these are not the procedures of the present invention where, as will be discussed below, a protease is reacted on baked meats (a residue of boiling extraction thereof). The beef extract and the meat liquid obtained by reacting a protease on meats without baking lack roast flavor, which is necessary in the fond de veau, but are difficult to be a material for the brown sauce.

A production process of a natural seasoning obtained by subjecting chicken bones and/or livestock bones, which have been subjected to a pre-treatment, such as heating or pressurization, to an enzyme treatment are also known (see JP-A-58-165763).

However, the object of that process is to obtain a natural seasoning that has such high transparency that can be used as clear soup and has good flavor, and it is such a process that is significantly complicated with high cost, in which an acidic protease is reacted and then an alkaline protease is reacted.

A fond de veau produced by a professional culinarian in a restaurant has pleasant aroma, plenty of body and flavor, whereas general industrial-made fond de veau for home use or food service industry has problems in quality as they are characterless and lack sufficient taste because of the use of extracts that are not subjected to baking and frying of materials, and thus there is a significant difference in quality between them.

Accordingly, there remains a need for a process which is capable of producing fond de veau on an industrial scale which retains the flavor of fond de veau prepared by professional culinarians.

SUMMARY OF THE INVENTION

It is an object of the present invention to provide a process which can be practiced on an industrial scale and produces a fond de veau which has the flavor of fond de veau prepared by professional culinarians.

It is another object of the present invention to provide a fond de veau prepared by such a process.

Thus, an important aspect of the present invention relates to the "pleasant flavor" obtained through the cooking operations involved in the preparation of a fond de veau, and performing these operations in a manner which provides a process that can be practiced on an industrial scale. In this manner, a high quality fond de veau is provided which has the flavor of a professionally-made fond de veau but is produced on a industrial scale and exhibits a high yield.

The present invention is based, in part, on the inventors' success in elucidating the flavor of the professionally-made fond de veau. It has been found that in order to obtain fond de veau having pleasant flavor in an industrial manner, baked meats are boiled for extraction, followed by reacting with a protease on the residue thereof, to decompose proteins remaining in the residue, or a protease is directly reacted with baked meats without boiling extraction to decompose proteins of the meats, whereby a meat extract having pleasant flavor can be extracted at a high yield.

Thus, the objects of the present invention, and others, may be accomplished with a brown broth, comprising:

(A) a solution obtained by:
  (i) boiling a baked meat;
  (ii) separating the boiled baked meat into (a) a solid meat residue and
  (b) a liquid meat extract;
  (iii) reacting the solid meat residue (a) with a protease;
  (iv) isolating (c) a liquid portion (a protein decomposition solution) from the solid meat residue (a) treated with the protease; and
  (v) combining (b) and (c); and
(B) an extract obtained by boiling fried vegetables.

The objects of the present invention may also be accomplished with a brown broth, comprising:

(A) a protein hydrolytic solution obtained by:
  (i) reacting a protease with a baked meat without boiling; and
  (ii) isolating a liquid from the protease-reacted meat; and
(B) an extract obtained by boiling fried vegetables.

The objects of the present invention may also be accomplished with a method of making the brown broth, comprising combining (A) a solution obtained by:
  (i) boiling a baked meat;
  (ii) separating the boiled baked meat into (a) a solid meat residue and
  (b) a liquid meat extract;
  (iii) reacting the solid meat residue (a) with a protease;
  (iv) isolating (c) a liquid portion (a protein decomposition solution) from the solid meat residue (a) treated with the protease; and
  (v) combining (b) and (c); and
(B) an extract obtained by boiling fried vegetables.

The objects of the present invention may also be accomplished with method of making a brown broth, comprising combining (A) a protein hydrolytic solution obtained by:
  (i) reacting a protease with a baked meat without boiling; and
  (ii) isolating a liquid from the protease-reacted meat; and (B) an extract obtained by boiling fried vegetables.

The objects of the present invention may also be accomplished with a brown broth obtained by the methods described above.

According to the present invention, a brown broth, such as a fond de veau, having pleasant flavor and a high yield can be easily obtained a manner which is suitable for production on an industrial scale.

A more complete appreciation of the invention and many of the attendant advantages thereof will be readily obtained as the same becomes better understood by reference to the following detailed description.

DETAILED DESCRIPTION OF THE INVENTION

The brown broth of the present invention, such as a fond de veau (a veal extract), can be produced by using:

(i) a protein hydrolytic solution and a boiled extract of baked meats (the mixture of both is referred to as a bone or a meat extract), and an extract obtained by boiling fried vegetables (referred to as a vegetable extract), the protein hydrolytic solution being obtained in such a manner that a boiled extract corresponding to the boiled extract of baked meats, is separated from boiled baked meats and a protease is reacted with the residue of the meats to obtain a protein hydrolytic product, which is then subjected to a solid-liquid separation to obtain the protein hydrolytic solution on the liquid side; or (ii) a protein hydrolytic solution obtained by reacting a protease with baked meats without boiling to obtain a protein hydrolytic product, which is then subjected to a solid-liquid separation to obtain the protein hydrolytic solution on the liquid side (referred to as a bone or a meat extract), and an extract obtained by boiling fried vegetables (referred to as a vegetable extract).

Thus, a fond de veau having pleasant flavor with a high yield can be produced by using, i.e., mixing:

(A)(i) a protein decomposition solution (a protein hydrolytic solution), the protein decomposition solution being obtained in such a manner that a boiled extract (a boiled extract of baked meats) is separated from baked meats boiled and a protease is reacted on a residue of the meats, and said boiled extract of baked meats thus separated, or (ii) a protein hydrolytic solution obtained by reacting a protease on baked meats without boiling, and (B) an extract obtained by boiling fried vegetables.

Thus, the protein decomposition solution may be obtained by (i) boiling a baked meat;
(ii) separating the boiled baked meat into (a) a solid meat residue and (b) a liquid meat extract;
(iii) reacting the solid meat residue (a) with a protease;
(iv) isolating (c) a liquid portion from the solid meat residue (a) treated with the protease; and
(v) combining (b) and (c).

Thus, the protein hydrolytic solution may be obtained by
(i) reacting a protease with a baked meat without boiling; and
(ii) isolating a liquid from the protease-reacted meat.

Procedures for preparing the extract obtained by boiling fried vegetables are well-known to those skilled in the art.

In general, a fond de veau is produced by boiling baked bone and meats, such as beef bone and fibrous beef, and fried vegetables. A professional culinarian mixes and extracts all the materials for a long period of time to complete fond de veau (see Reference Example 1 described hereinafter).

In the process of the present invention, a protein hydrolytic solution, which is obtained in such a manner that baked bones and meats are solely (independently, i.e., in the absence of the fried vegetable) boiled for extraction, and a protease is reacted with a residue formed by separating an extract solution after boiling (bones and meats as an extract residue), is used as a part of an extract of baked bones and meats boiled, or a protein hydrolytic solution, which is obtained by directly reacting a protease on baked meats without boiling, is used as a meat extract, and the extract and a vegetable extract are used to realize a high yield while maintaining quality of the product.

Thus, an important feature of the present invention is that the meats and vegetables are not boiled together as they are in the typical process carried out by a professional culinarian in, for example, a restaurant. Rather, the meats and the fried vegetables are separately treated and then the components indicated above are combined to form the brown browth, e.g., fond de veau.

This is ascribed to the fact that after extracting by boiling baked meats for from 0 to 12 hours, preferably from 4 to 6 hours, proteins of a residue are decomposed with a protease to enable extraction of meat flavor in a high yield, or the fact that a protein hydrolytic solution obtained by directly reacting a protease on baked meats as they are is used as a meat extract. In this connection, such a way of use of a protease in the production of a fond de veau (i.e., a protease is reacted on a residue formed by boiling meats having been baked and separating an extracted matter from the meats boiled, or directly reacted on the baked meats as they are) has not been known prior to the present invention.

The protease (proteolytic enzyme) used in the present invention includes those obtained from bacteria, fungi (mold), actinomycetes, plants, animals and the like, and those obtained from fungi, which have less bitterness and form a large amount of amino acids, are preferred. The using amount thereof varies depending on the enzyme formulation used, and is in brief an effective amount, which can be easily determined in cases by a skilled person in the art.

The meats used in the present invention are not particularly limited as far as they are bones, such as beef bones and chicken bones, fibrous beef, whole chicken and the like, that are generally used for production of foods, and beef bones and fibrous beef are preferably used from the standpoint of desirability in taste and flavor.

The brown broth, such as fond de veau, having pleasant flavor in the present invention preferably has such bitterness with a "bitterness absorbance" suggesting the relationship between bitterness and the extinction quotient (ratio) at a particular wavelength, i.e., a ratio of extinction quotients at 280 nm and 260 nm of the resulting brown broth, such as a fond de veau, (extinction quotient at 280 nm)/(extinction quotient at 260 nm), of 1.0 or less, and more preferably 0.8 or less. When the value is higher than 1.0, it is not preferred since pleasant flavor owing to baking of meats and vegetables is insufficient. It is more preferred when the value is 0.8 or less since the pleasant flavor owing to baking of meats and vegetables becomes significant.

The measurement of the extinction quotient (determination of absorbance) is carried out in the following manner. 1 g of fond de veau is added to 9 ml of distilled water and suspended therein. The resulting suspension is subjected to centrifugal separation, and 2 ml of the supernatant is adsorbed in a feed at a rate of 5 ml/min on "Waters Sep pak C8 plus" equilibrated with distilled water. It is sequentially rinsed (washed) with 3 ml of distilled water (flow rate: 5 ml/min) and 5 ml of a 10% ethanol aqueous solution (flow rate: 5 ml/min), and 5 ml of the objective bitterness fraction (bitterness component) is eluted with a 50% ethanol aqueous solution (flow rate: 5 ml/min) and thereby obtained. The fraction eluted with a 50% ethanol aqueous solution is diluted five times with a 50% ethanol aqueous solution to obtain a diluted solution, and it is measured for extinction quotient.

The yield value in the present invention is calculated in the following manner. That is, a value obtained by (finished liquid amount (g) x Brix (%))/raw material (g) is used. The values used for the calculation are obtained in the following manner. The weight (g) of the finalized brown broth, such as fond de veau, at 25° C. is designated as the (finished liquid amount (g)). 1 ml thereof is collected, and a value of Brix (solid amount) measured with a handy sugar content meter ("C Type C-4", produced by Iuchi Seieido Co., Ltd.) is designated as the (Brix (%)). The value of the total weight of the raw materials used for preparation of the fond de veau is designated as the (raw material (g)).

That is, when the yield value in the present invention is higher, it suggests that the yield is higher. The term "high yield" in the present invention means that the yield value is 6.0 or more.

EXAMPLES

The present invention will be described in more detail with reference to the following examples, which are provided herein for purposes of illustration only and are not intended to be limiting unless otherwise specified.

The production process of fond de veau prepared by a professional culinarian is exemplified below. It is represented by the following Reference Example 1 but is not limited to this specific production process.

Reference Example 1

Production Example of Fond de Veau by a Professional Culinarian 2.5 kg of beef bones and 1 kg of fibrous beef (corresponding to bones and meats) are baked at 200° C. for 40 minutes by using an oven to obtain a beautiful brown roasted color. Separately, 0.5 kg of carrot, 0.5 kg of onion, 0.15 kg of celery and 0.025 kg of garlic (corresponding to vegetables) are fried in a frying pan at a pan surface temperature of 150° C. for from 5 to 10 minutes with 5% of an oil (relative to the weight of the vegetables) to obtain a beautiful roasted color, i.e., they are fried to form a caramel flavor. The raw materials are placed in a stock pot (pan) of a diameter of 27 cm, and 90 g of a tomato paste, 275 g of tomato, 6 g of parsley, 2.5 g of thyme, one piece of bay leaf and 5 L of water are added thereto, followed by boiling them for about 8 hours. Skimming is carried out during boiling. After 8 hours, the contents are filtered to separate the liquid from the solids.

The fond de veau prepared according to the above conditions is designated as a reference product of the present invention.

The reference product was measured for a bitterness absorbance and a yield value for the latter analysis.

As a result, the reference product had a bitterness absorbance of 0.8 and a yield value of 4.0.

Example 1 (Enzyme Treatment)

2 kg of beef bones and 0.4 kg of fibrous beef (corresponding to bones and meats) were baked at 200° C. for 40 minutes or so by using an oven until to obtain a beautiful brown roasted color. Separately, 0.3 kg of carrot, 0.3 kg of onion, 0.09 kg of celery and 0.015 kg of garlic (corresponding to vegetables) were fried in a frying pan at a pan surface temperature of 150° C. for from 5 to 10 minutes or so with 5% of an oil (relative to the weight of the vegetables) until to obtain a roasted color, i.e., they are fried to form caramel flavor.

The beef bones were placed in a stock pot (pan) of a diameter of 21 cm and boiled with 5 kg of water for 8 hours while maintaining a slightly boiling state. Skimming is carried out during boiling. After 8 hours, the contents were filtered to separate the liquid from the solids to obtain a beef bone extract (bone extract). The fibrous beef baked at 200° C. for 40 minutes or so to obtain a beautiful brown roasted color was minced and placed in a stock pot of a diameter of 21 cm, and it was boiled with 1 kg of water for 4 hours while maintaining a slightly boiling state. Thereafter, a liquid part and a meat residue were subjected to a solid-liquid separation to obtain a meat extract as a liquid part. Furthermore, a protease ("Protease M" produced by Amano Pharmaceutical Co., Ltd.) was added to the meat residue in an amount of 0.02% based on the raw meats and subjected to an enzyme reaction under conditions of from 40 to 50° C. for about one hour. Thereafter, the enzyme was deactivated by maintaining at 95° C. for 15 minutes, and an enzyme treated meat extract was obtained by centrifugal separation. Furthermore, the vegetables fried in a frying pan at a pan surface temperature of 150° C. for from 5 to 10 minutes or so until to obtain a roasted color, as produced above, 165 g of tomato, 54 g of a tomato paste, 3.6 g of parsley, 1.3 g of thyme, ¾ piece of bay leaf were placed in a stock pot of a diameter of 21 cm and boiled with 2 kg of water for 2 hours while maintaining a slightly boiling state. Thereafter, a liquid part and a solid were subjected to solid-liquid separation to obtain a vegetable extract as a liquid part. Furthermore, a vegetable residue was subjected to centrifugal separation to obtain a vegetable separated extract.

The beef bone extract, the meat extract, the enzyme treated meat extract, the vegetable extract and the vegetable separated extract were placed in a stock pot of a diameter of 21 cm and concentrated by heating for 4 hours to obtain an example product.

The example product was measured for a bitterness absorbance and a yield value for the latter analysis.

As a result, the example product had a bitterness absorbance of 0.8 and a yield value of 6.2.

The results of bitterness absorbance and yield value of the two kinds of fond de veau prepared according to the production processes of Reference Example 1 (Reference Product) and Example 1 (Example Product) are shown in Table 1 below.

TABLE 1

| Property | Determined Results | |
|---|---|---|
| | Reference Product | Example Product |
| Bitterness absorbance | 0.8 | 0.8 |
| Yield value | 4.0 | 6.2 |

It was understood from the Table 1 that both the fond de veau prepared according to the conditions in Example 1 (Example Product) and the fond de veau prepared according to the conditions in Reference Example 1 (Reference Product) had a bitterness absorbance of 0.8 or less to have pleasant flavor, and the example product exhibited a high yield value.

The two kinds of fond de veau produced according to the production processes in Reference Example 1 and Example 1 were subjected to a sensory evaluation for aroma, taste and flavor. That is, by using five panelists, the respective evaluation items were evaluated for the product according to the production process in Example 1 (Example Product) by five grades of −2, −1, 0, +1 and +2, assuming that the product according to the professional process in Reference Example 1 (Reference Product) was a grade of 0. A higher value means a higher grade of the sensory evaluation. The evaluation results are shown in the Table 2.

TABLE 2

Evaluation Results

| Evaluation Parameter | Example Product |
| --- | --- |
| Goodness in flavor | 0 |
| Intensity in sweetness | +1 |
| Solidness in taste | 0 |
| Intensity of gustation | +2 |
| Desirability as fond de veau | +1 |

It was understood from the Table 2 that the fond de veau prepared according to the conditions in Example 1 (example product) exhibited such results that it had flavor that was equivalent to the fond de veau prepared according to the conditions in Reference Example 1 (reference product) and had a strong gustation.

This application is based on Japanese Patent Application Serial No. 2001-131520, filed on Apr. 27, 2001, which is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A brown broth, comprising (A) and (B) wherein:
   (A) is a solution obtained by:
   (i) boiling a baked meat;
   (ii) separating the boiled baked meat into (a) a solid meat residue and (b) a liquid meat extract;
   (iii) reacting the solid meat residue (a) with a protease;
   (iv) isolating (c) a liquid portion (a protein decomposition solution) from the solid meat residue (a) treated with the protease; and
   (v) combining (b) and (c); and
   (B) is an extract obtained by boiling vegetables.

2. The brown broth of claim 1, which has a bitterness absorbance of 1.0 or less.

3. The brown broth of claim 1, which has a yield value of 6.0 or more.

4. The brown broth of claim 1, which is a fond de veau.

5. The brown broth of claim 1, wherein the meat is beef.

6. The brown broth of claim 1, wherein the meat is chicken.

7. The brown broth of claim 1, wherein the meat is fibrous beef.

8. The brown broth of claim 1, wherein the protease is from bacteria, fungi, actinomycetes, plants, or animals.

9. The brown broth of claim 1, wherein the vegetables are one or more members selected from the group consisting of carrots, onions, celery, and garlic.

10. A brown broth, comprising (A) and (B) wherein:
    (A) is a protein hydrolytic solution obtained by:
    (i) reacting a protease with a baked meat without boiling; and
    (ii) isolating a liquid from the protease-reacted meat; and
    (B) is an extract obtained by boiling fried vegetables.

11. The brown broth of claim 10, which has a bitterness absorbance of 1.0 or less.

12. The brown broth of claim 10, which has a yield value of 6.0 or more.

13. The brown broth of claim 10, which is a fond de veau.

14. The brown broth of claim 10, wherein the meat is beef.

15. The brown broth of claim 10, wherein the meat is chicken.

16. The brown broth of claim 10, wherein the meat is fibrous beef.

17. The brown broth of claim 10, wherein the protease is from bacteria, fungi, actinomycetes, plants, or animals.

18. The brown broth of claim 10, wherein the vegetables are one or more members selected from the group consisting of carrots, onions, celery, and garlic.

* * * * *